United States Patent [19]

Kaneko et al.

[11] Patent Number: 4,494,130

[45] Date of Patent: Jan. 15, 1985

[54] LASER PRINTER

[75] Inventors: Yutaka Kaneko, Yokohama; Yokata Takashi, Tokyo, both of Japan

[73] Assignee: Ricoh Company, Ltd., Japan

[21] Appl. No.: 398,630

[22] Filed: Jul. 15, 1982

[30] Foreign Application Priority Data

Jul. 15, 1981 [JP] Japan .................. 56-109273
Oct. 31, 1981 [JP] Japan .................. 56-174735

[51] Int. Cl.$^3$ ........................................... G01D 15/14
[52] U.S. Cl. ..................................................... 346/160
[58] Field of Search ................................ 346/108, 160

[56] References Cited

U.S. PATENT DOCUMENTS 3,132,206  5/1964  King ........................... 346/160 X
4,044,385  8/1977  Nishimura et al. ......... 346/160 X
4,180,822 12/1979  Hudson et al. ................. 346/108

OTHER PUBLICATIONS

Weigl, Low Voltage Electrographic Recording, Xerox Disclosure Journal, May/Jun. 1980, pp. 285-286.

Primary Examiner—Thomas H. Tarcza
Attorney, Agent, or Firm—Guy W. Shoup

[57] ABSTRACT

A laser printer including a photosensitive belt driven for travel while having its position of travel regulated by one drive roller and at least one follower roller and serving as regulating means, a charger, a scanning and exposing device for directing a laser beam modulated in accordance with image signals on the surface of said photosensitive belt, and a developing device for developing an electrostatic latent image formed of the surface of the photosensitive member by scanning and exposing. The laser beam is incident on the surface of the photosensitive belt in a portion thereof in contact with the regulating means or in the vicinity thereof, to thereby avoid a reduction in the quality of the formed image due to a waving phenomenon of the photosensitive member. To prevent formation of a ghost image by the scattered light on the surface of the photosensitive member, the angle relative to the normal to the surface of the photosensitive belt of the laser beam is not made zero. The charger is located in juxtaposed relation to the tension side of the photosensitive member of the endless belt type, and the developing device is located in juxtaposed relation to a portion in contact with the drive roller, to avoid variations in the gap between the photosensitive member and the developing member and the charger.

10 Claims, 14 Drawing Figures

LASER PRINTER

BACKGROUND OF THE INVENTION

This invention relates to a laser printer.

A laser printer comprises means for radiating a laser beam, modulator means for modulating the laser beam in accordance with image signals, and deflector means comprising a rotary polyhedral mirror for deflecting the path of the laser beam modulated in accordance with the image signals to scan the surface of a photosensitive member. The laser beam deflected by the deflector means is incident on the surface of the photosensitive member to carry out scanning thereof to effect exposing of the photosensitive member to an image of a document and form an electrostatic latent image thereon. The latent image is developed into a visible image to produce a print. It has hitherto been usual practice to use a photosensitive member in the form of a drum.

To meet the requirements for increasing space efficiency and obtaining an overall compact size in a laser printer, however, proposals have recently been made to use a photosensitive member in the form of an endless belt. It has been found that when a photosensitive member of the drum type is replaced by a photosensitive member of the endless belt type, trouble occurs that has not been associated with the photosensitive member of the drum type.

More specifically, it has been found that the endless belt tends to undulate in wave form in operation, thereby causing variations in the belt travelling speed and loosening of the belt to occur locally.

When the laser beam is incident on the surface of the photosensitive member in a position midway between the photosensitive belt support rollers, the formation of an image on the photosensitive member is adversely affected by the aforesaid waving phenomenon, local variations in belt travelling speed and loosening of the belt.

When the photosensitive member moves in wave form or slackens in a position in which the charger or the developing sleeve of the developer is juxtaposed against the photosensitive member, variations occur in the corona discharge distance and developing gap and the charging performance and developing performance are adversely affected.

A rotary polyhedral mirror of the regular polygonal shape is widely used as a laser beam deflector. When a laser beam is caused to be incident on the rotary polyhedral mirror at a right angle to the axis of rotation of the rotary polyhedral mirror, the light scattered by the surface of the photosensitive member is reflected and travels backwardly to fall on the rotary polyhedral mirror again. The reflected light forms a stationary ghost image on the surface of the photosensitive member. In an effort to avoid the phenomenon of ghost image formation, an attempt has been made to cause a laser beam to be incident on the surface of the photosensitive member in the form of an endless belt in an oblique direction with respect to the ancillary scanning direction while allowing the incident rays and the axis of rotation of the rotary polyhedral mirror to form an angle of 90 degrees, to thereby minimize reflection of the scattered light by the surface of the photosensitive member that travels backwardly and falls on the rotary polyhedral mirror again. When this process is used with a laser printer including a photosensitive member of the endless belt type, the beam incident position would show variations in the ancillary scanning direction if the photosensitive belt undulates in wave form in the laser beam incident position.

SUMMARY OF THE INVENTION

This invention has been developed for the purpose of obviating the aforesaid disadvantages of the prior art. An object of the invention is to provide a laser printer capable of avoiding the influences which might otherwise be exerted on the quality of an image formed on the photosensitive member of the endless belt type as by the phenomenon of undulation of the photosensitive member.

Another object is to provide a laser printer capable of avoiding the influences of a waving phenomenon of the photosensitive member of the endless belt type exerted on the quality of an image formed on the photosensitive member and also of preventing formation of a ghost image even if the angle formed by the light incident on the surface of the rotary polyhedral mirror and the axis of rotation of the rotary polyhedral mirror is 90 degrees to keep the scanning line from curving.

DESCRIPTION OF THE PREFERRED EMBODIMENTS

The problems caused by the waving phenomenon of the photosensitive member of the endless belt type in a laser printer of the prior art will first be outlined, before the invention is described in detail.

Figure 1:
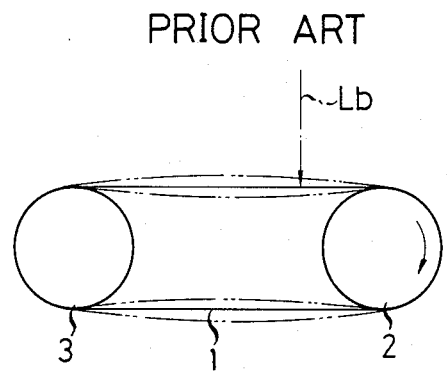
FIG. 1 is a view in explanation of the waving phenomenon of a photosensitive member of the endless belt type.

When a photosensitive member 1 of the endless belt type is trained over a drive roller 2 and a follower roller 3, it is inevitable that the photosensitive member 1 exhibits what is generally referred to as a waving phenomenon when it is driven to travel. When this phenomenon occurs, the photosensitive member 1 oscillates transversely as indicated by imaginary lines between the two rollers 2 and 3 in FIG. 1 (also in FIGS. 2, 3, 8 and 9). Thus, when a laser beam Lb is arranged to be incident on the photosensitive member 1 in a position midway between the drive roller 2 and the follower rollers 3 as shown in FIG. 1, the image formed on the photosensitive member is directly influenced by the waving phenomenon of the photosensitive member 1.

Figure 2:
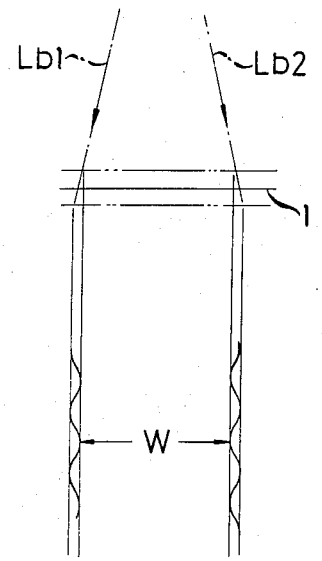
FIG. 2 is a view in explanation of variations in the scanning width by the laser beam due to the waving phenomenon of the photosensitive member of the endless belt type.

More specifically, as shown in FIG. 2, the laser beam is oscillated in segmental form in a main scanning direction by the scanner, and the width of scanning is decided by the junctions between opposite ends Lb1 and Lb2 of the laser beam Lb and the photosensitive member 1. However, the opposite ends Lb1 and Lb2 of the laser beam Lb are angled in the main scanning direction with respect to the surface of the photosensitive member 1, so that the scanning width W shows variations as the photosensitive member 1 moves vertically when the waving phenomenon occurs. This causes undulation to occur in an image formed on the photosensitive member 1.

The laser beam Lb forms a laser beam spot on the surface of the photosensitive member 1 which has a different cross-sectional diameter depending on the position in which its cross-sectional size is determined. Thus a change in the level of the photosensitive member that might be caused by the waving phenomenon causes a variation to occur in the beam spot forming an image, thereby deteriorating the quality of the image obtained.

Figure 3:
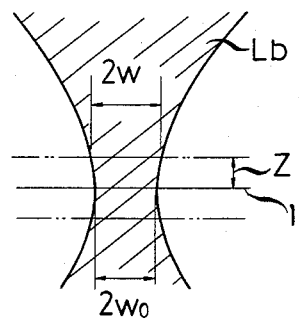
FIG. 3 is a view in explanation of variations in the diameter of the beam spot on the photosensitive member of the endless belt type caused by the waving phenomenon.

This problem will be further discussed by referring to FIG. 3 in which the radius of the laser beam Lb in a position spaced apart by a distance Z from the beam waist is expressed by the following equation:

$$w = w_o \sqrt{1 + \left(\frac{\lambda Z}{\pi w_o^2}\right)^2}$$

where
$w_o$: the radius of the beam waist.
$w$: the radius of the beam in an arbitrarily selected position.
$\lambda$: the wavelength.

The beam diameter would be influenced by the difference between the value expressed by the above equation and the radius of the beam waist.

Figure 4:
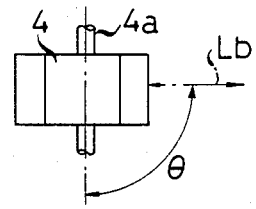
FIG. 4 is a side view of a deflector in the form of a rotary polyhedral mirror in which a laser beam is incident on the deflector at a right angle thereto.
Figure 5:
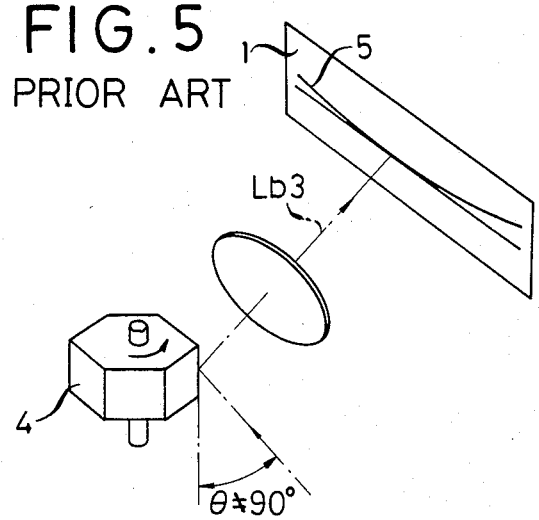
FIG. 5 is a perspective view of a part of a laser printer showing the locus of a beam spot formed on the photosensitive member of the endless belt type by a laser beam incident on the rotary polyhedral mirror on the angle to the axis of rotation thereof.

When the laser beam Lb incident on a rotary polyhedral mirror 4 is at a right angle to the axis of rotation 4a as shown in FIG. 4, the light scattered by the photosensitive member would be reflected thereby and travel backwardly to be incident on the rotary polyhedral mirror 4 again, to form a stationary ghost image thereon. To avoid this defect, one has only to render the angle formed by the incident laser beam and the axis of rotation 4a of the rotary polyhedral mirror not 90 degrees. However, when this angle is other than 90 degrees, a reflected light Lb3 would draw a locus 5 of spots on the photosensitive member 1 which would be curving as shown in FIG. 5. This would make it impossible to effect accurate scanning of the photosensitive member 1 by the laser beam Lb.

Thus it becomes necessary to provide means whereby formation of a stationary ghost image can be prevented when the laser beam Lb is incident on the surface of the rotary polyhedral mirror 4 in such a manner that the incident beam and the axis of rotation 4a of the mirror 4 form an angle of 90 degrees.

Figure 6:
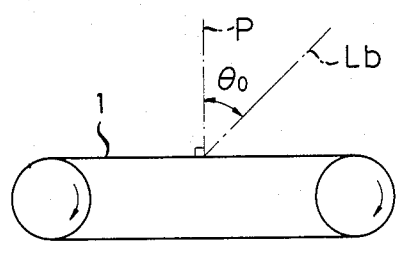
FIG. 6 is a view showing the manner in which the laser beam obliquely is incident on the photosensitive member of the endless belt type.

To attain the end, proposals have been made to cause the laser beam Lb to be incident on the surface of the photosensitive member 1 in such a manner that a normal P to the surface of the photosensitive member 1 and the locus of the laser beam Lb on the surface of the photosensitive member 1 formed as the former scans the latter form an angle $\theta_o$ which is $\theta_o \neq \theta^o$, as shown in FIG. 6. This would reduce the chance of the light scattered by the photosensitive member 1 travelling backwardly toward the rotary polyhedral mirror, thereby lessening the possibilities of ghost image formation.

Figure 7:
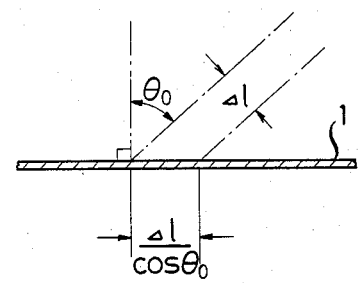
FIG. 7 is a view in explanation of a variation in the laser beam incident position on the photosensitive member of the endless belt type attributed to an error in the surface aligning precision of the rotary polyhedral mirror which occurs when the laser beam is obliquely incident on the photosensitive member.

However, when the laser beam is incident on the surface of the photosensitive member in a position midway between the two rollers as shown in FIG. 7, the diameter of the beam spots formed on the photosensitive member of the endless belt type would show variations due to transverse oscillation of the photosensitive member of the endless belt type when the waving phenomenon occurs as aforesaid. To eliminate the variations in the diameter of the laser beam spots, one has only to increase the angle $\theta_o$. However, when the angle $\theta_o$ is increased in value, another defect would occur. More specifically, as can be seen in FIG. 7, a variation in the scanning position of the laser beam Lb which is attributed to an error in the surface aligning precision of the rotary polyhedral mirror is $\Delta l$ in the air but it becomes $\Delta l/\cos \theta_o$ on the surface of the photosensitive member 1. The greater the angle $\theta_o$, the larger becomes the variation on surface of the photosensitive member 1. Moreover, the angle of incidence $\theta_o$ of the laser beam on the surface of the photosensitive member 1 undergoes a change and, as a result, the value of $1/\cos \theta_o$ also shows a change. Thus the position on the photosensitive member in which the laser beam scans the photosensitive member shows a change with respect to the ancillary scanning direction of the image to be printed, thereby causing further deterioration of the image.

The invention will now be described by referring to the embodiments shown in the drawings. The invention is characterized in that the position on the photosensitive member of the endless belt type in which the laser beam is incident on the surface of the photosensitive member is on a portion of the photosensitive member which is in contact with regulating means for regulating the travel of the photosentive member or in the vicinity thereof.

Figure 8:
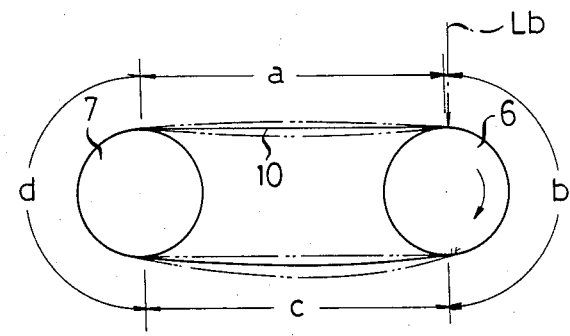
FIG. 8 is a side view of the photosensitive member of the endless belt type in explanation of an example of the laser beam incident position according to the invention.

FIG. 8 shows one embodiment in which the photosensitive belt 10 is trained over the drive roller 6 and the follower roller 7 which constitute regulating means for regulating the travel of the photosensitive belt 10. When the photosensitive belt 10 is driven to travel in the direciton of an arrow, the photosensitive member 10 can be divided into the four regions of run or regions a, b, c and d, due to differences in velocity characteristic and flatness of the belt. Of the four regions, it is the region b or the drive roller side run that has the least variation in position with respect to other units of the printer. Although developing a waving phenomenon, the upper region a or the tension side of the photosensitive belt has a relatively small change in position. It is the regions b and a that have a stable photosensitive belt travelling velocity. The regions c or the slack side of the photosensitive belt 10 tends to develop variations in position and travelling velocity due to the waving phenomenon. The region d or the follower roller side run tends to develop a variation in travelling velocity.

When the characteristics of the various regions of the runs of the photosensitive belt 10 described hereinabove are taken into consideration, it will be apparent that the steps of charging, exposing essential to the formation of the image are advantageously carried out while the photosensitive belt 10 shifts from the region a or the upper run to the region b or the drive roller side run.

More specifically, it would be advantageous to select as an exposing position the drive roller side run b in which variations in the photosensitive belt surface and the travelling velocity are minimized or the upper run a immediately before the upper run of the photosensitive belt 10 is brought into contact with the drive roller 6. The developer is advantageously arranged near the drive roller side run b in which the photosensitive member 10 is in contact with the drive roller 6 and variations in the developing gap and the travelling velocity are minimized. The charger is advantageously arranged in the vicinity of the upper run a in which the photosensitive belt is flat and variations in the photosensitive surface are minimized.

In the embodiment shown in FIG. 8, the laser beam is made to be incident on a portion of the surface of the photosensitive belt 10 which is in contact with the drive roller 6. No waving phenomenon occurs in this portion of the photosensitive belt 10, thereby enabling the influences exerted in the prior art by the waving phenomenon on the quality of the image formed on the photosensitive belt as described hereinabove can be avoided.

The position on the surface of the photosensitive belt 10 on which the laser beam Lb is made to be incident is not limited to the aforesaid specific position and such position may be disposed in the follower roller side run d or in the vicinity thereof in which the photosensitive belt 10 is in contact with the follower roller 7. However, in this region, the photosensitive belt 10 expands and contracts in the travelling direction during its travel and variations in travelling velocity or longitudinal oscillations occur locally. Thus it is not desirable to carry out exposing in such portion of the photosensitive belt because no image of high quality can be obtained. It would rather be desirable to carry out exposing in the drive roller side run b or in the vicinity thereof in which the photosensitive belt 10 is in contact with the drive roller 6 and longitudinal oscillations are minimized and the photosensitive belt 10 runs at constant velocity.

Figure 9:
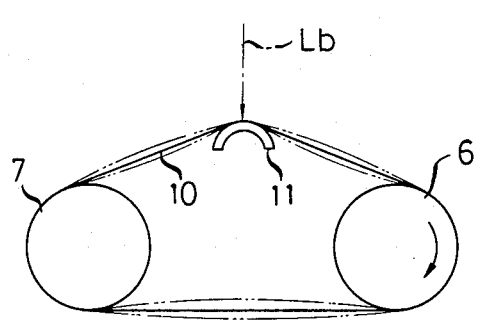
FIG. 9 is a side view of the photosensitive member of the endless belt type showing another example of the laser beam incident position according to the invention.

FIG. 9 shows another embodiment of the invention in which a curved member 11 has its back in pressing engagement with the upper run of the photosensitive belt 10 in a position midway between the drive roller 6 and the follower roller 7. The upper run of the belt 10 in contact with the curved member 11 is free from the waving phenomenon. In this embodiment, the laser beam Lb is radiated in a manner to be incident on the surface of the photosensitive belt 10 in the position in which the curved member 11 is in contact with the belt 10, to carry out scanning of the surface of the belt 10 by the laser beam Lb to effect exposing.

Figure 10:
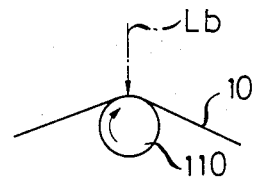
FIG. 10 is a side view of the photosensitive member of the endless belt type showing still another example of the laser beam incident position according to the invention.

FIG. 10 shows a modification of the embodiment shown in FIG. 9 in which the curved member 11 is replaced by a rotary roller 110. The laser beam Lb is made to be incident on the surface of the photosensitive belt 10 in a position in which the rotary roller 110 is in contact with the belt 10 or in the vicinity thereof, to allow the laser beam Lb to scan the surface of the belt 10 to effect exposing.

Figure 11:
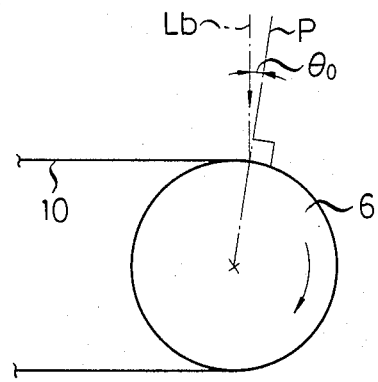
FIGS. 11, 12 and 13 are side views of the photosensitive member of the endless belt type corresponding to FIGS. 8, 9 and 10 respectively in which a laser beam is directed in a manner to be obliquely incident on the surface of the photosensitive member.
Figure 12:
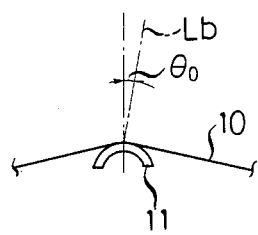
Figure 13:
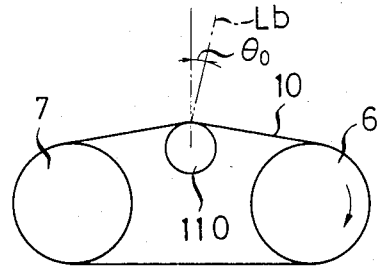

To avoid formation of a ghost image as described in the second object of the invention, still another embodiment is shown in FIG. 11 in which, as in the embodiment described by referring to FIG. 8, the angle at which the laser beam Lb is incident on the surface of the photosensitive belt 10 is set in such a manner that the angle $\theta_o$ formed by the normal P in the laser beam incident position on the belt 10 and the locus of the path of the laser beam Lb formed by scanning satisfies the condition $\theta_o = 0°$. By this arrangement, possibilities of ghost image formation can be eliminated and at the same time undesirable influences exerted by the waving phenomenon can be advantageously avoided, even if the laser beam Lb is radiated and made to be incident on the rotating polyhedral mirror at a right angle to the axis of rotation thereof. An embodiment shown in FIG. 12 represents this concept as incorporated in the embodiment shown in FIG. 9, and an embodiment shown in FIG. 13 represents this concept as incorporated in the embodiment shown in FIG. 10. It is to be understood that the embodiments shown in FIGS. 12 and 13 can achieve the same effects as described by referring to the embodiment shown in FIG. 11.

Figure 14:
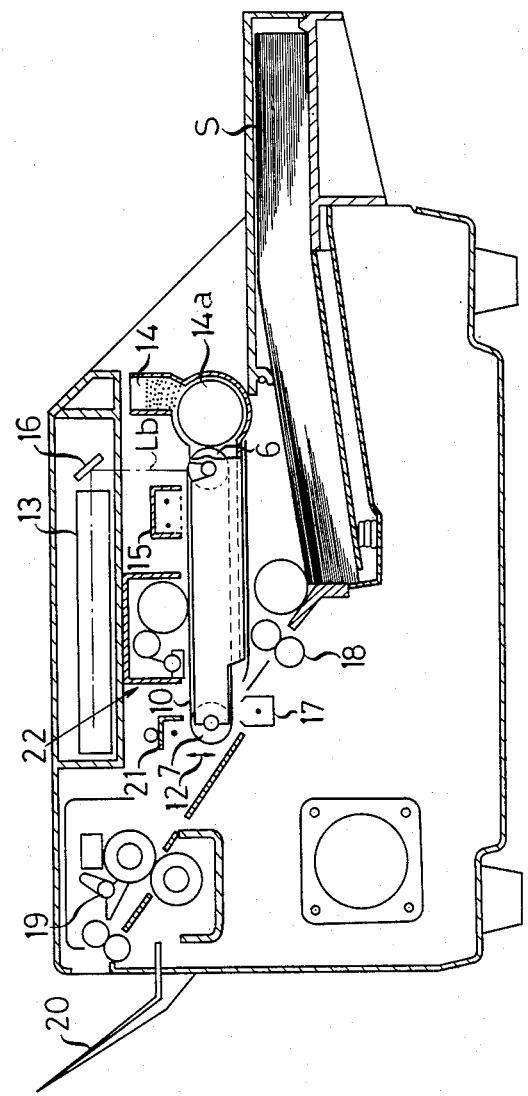
FIG. 14 is a sectional view of an example of the laser printer in which the invention is incorporated.

FIG. 14 shows an example of the laser printer which is in actual use. In this laser printer, the photosensitive belt 10 shows a deviation between the drive roller 6 and the follower roller 7. In order to correct the deviation of the belt 10, a sensor, not shown, is arranged in juxtaposed relation to the end surface of the belt 10 and produces an output for causing one axial end of the follower roller 7 to be displaced in the direction of an arrow designated by the numeral 12.

Because of this arrangement, the photosensitive belt 10 is displaced by the control effected for correcting the deviation of the belt 10 in addition to being displaced by the waving phenomenon during travel. Thus the photosensitive belt 10 except for the curved portion thereof which is in contact with the drive roller 6 is displaced, so that the normal direction of the photosensitive belt 10 is considered to be displaced at all times. However, such displacement does not essentially occur in the curved portion of the photosensitive belt 10 which is in contact with the drive roller 6. This makes it possible to render the incidence angle $\theta_o$ of the laser beam Lb radiated from a laser beam radiating unit 13 $\theta_o = 0°$ even if the laser beam Lb is made to be incident on the surface of the photosensitive belt 10 at a right angle thereto as shown. An additional advantage is that layout of the printer can be worked out with ease. The curved portion of the photosensitive belt 10 in contact with the drive roller 6 is least influenced by longitudinal vibrations of the belt 10, so that it is considered desirable to arrange the laser beam Lb to be incident on the surface of the belt 10 in this position. When the laser beam Lb is made to be incident on the belt 10 in this position, it is possible to mount a developer sleeve 14a of a developer 14 in a position in which it is in contact with the curved portion of the belt 10 in contact with the drive roller 6 in which variations in velocity and position are minimized. When this is the case, the position in which exposing is performed is located immediately before the developing device 14, so that it is possible to achieve the ancillary effect of the printing operation not being susceptible to the influences of attenuation of the electrostatic charge in the dark of the photosensitive belt 10. Also, a charger 15 mounted immediately before the exposing position can be arranged near the tension side of the photosensitive belt 10 in which changes in position are minimized.

The laser printer shown in FIG. 14 includes, in addition to the units already referred to, a mirror 16, a transfer-printing charger 17, a transfer-printing sheet conveyor roller 18, a fixing section 19, an ejected sheet tray 20, a charge removing charger 21 and a cleaning section 22. The symbol S designates transfer-printing sheets.

What is claimed is:

1. In a laser printer of the type having:
    a photosensitive member of the endless belt type trained over support means and driven for travel while having its position of travel regulated by said support means, said support means including one drive roller and at least one follower roller and serving as regulating means;
    means for charging the surface of the photosensitive belt;
    a scanning and exposing device including a laser beam irradiating means, a modulating means for modulating said laser beam in accordance with image signals, and means for deflecting the path of said laser beam to be incident on the surface of the photosensitive belt; and
    means for developing an electrostatic latent image formed on the surface of the photosensitive belt by scanning thereof by the laser beam;
    the improvement comprising:
    said means for deflecting being arranged such that the laser beam is incident on the surface of a portion of the photosensitive belt in contact with the regulating means or in the vicinity thereof, the angle of incidence of the laser beam being a non-zero angle with respect to a normal to the surface of the photosensitive belt;
    said charging means being located in juxtaposed relation to the flat tension side of the photosensitive belt; and
    said developing means being located in juxtaposed relation to a portion of the photosensitive belt in contact with said drive roller.

2. A laser printer as claimed in claim 1, wherein said regulating means is curved member located in a position midway between opposite ends of the photosensitive member of the endless belt type as viewed in the direction of travel of the photosensitive member of the endless belt type, said curved member being in pressing contact with the underside of the upper run of the photosensitive member of the endless belt type.

3. A laser printer as claimed in claim 1, wherein said regulating means is a rotary roller located in a position midway between opposite ends of the photosensitive member of the endless belt type as viewed in the direction of travel of the photosensitive member of the endless belt type, said rotary roller being in pressing contact with the underside of the upper run of the photosensitive member of the endless belt type.

4. A laser printer as claimed in claim 1, wherein said charging means is located in juxtaposed relation to the flat tension side of the photosensitive member of the endless belt type.

5. A laser printer as claimed in claim 1, wherein said developing means is located in juxtaposed relation to a portion of the photosensitive member of the endless belt type in which the drive roller is in contact with the photosensitive member of the endless belt type.

6. A laser printer comprising:
    means for radiating a laser beam;
    means for modulating said laser beam in accordance with image signals; and
    deflector means for deflecting the path of said modulated laser beam, so that the laser beam deflected by said deflector means is incident on the surface of a photosensitive member of the endless belt type to scan and expose the photosensitive member of the endless belt type;
    wherein the improvement resides in that the position in which said laser beam is incident on the surface of the photosensitive member of the endless belt type to expose same is in a position thereof which is in contact with regulating means for regulating the position of travel of the photosensitive member of the endless belt type or in the vicinity thereof, and that the angle of incidence of the laser beam on the surface of the photosensitive member of the endless belt type is set such that the angle $\theta_o$ formed by the normal to the surface of the photosensitive member of the endless belt type in a position in which the laser beam is incident on the surface of the photosensitive member of the endless belt type and the surface of the locus of laser beam formed by scanning and exposing meets the condition $\theta_o \neq 0°$.

7. A laser printer as claimed in claim 6, wherein said regulating means includes one of two rollers disposed opposite each other with respect to the direciton of travel of said photosensitive member of the endless belt type for supporting same.

8. A laser printer as claimed in claim 7, wherein said roller is a drive roller.

9. A laser printer as claimed in claim 6, wherein said regulating means is a curved member located in a position midway between opposite ends of the photosensitive member of the endless belt type as viewed in the direction of travel of the photosensitive member of the endless belt type, said curved member being in pressing contact with the underside of the upper run of the photosensitive member of the endless belt type.

10. A laser printer as claimed in claim 6, wherein said regulating means is a rotary roller located in a position midway between opposite ends of the photosensitive member of the endless belt type as viewed in the direction of travel of the photosensitive member of the endless belt type, said rotary roller being in pressing contact with the underside of the upper run of the photosensitive member of the endless belt type.

* * * * *